US008073076B2

(12) United States Patent
Hurt et al.

(10) Patent No.: US 8,073,076 B2
(45) Date of Patent: Dec. 6, 2011

(54) METHOD AND APPARATUS FOR PROCESSING A COMMUNICATION SIGNAL

(75) Inventors: James Young Hurt, San Diego, CA (US); Preethi Chandrasekhar, San Diego, CA (US); Roland Reinhard Rick, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 815 days.

(21) Appl. No.: 11/962,655

(22) Filed: Dec. 21, 2007

(65) Prior Publication Data

US 2009/0161737 A1 Jun. 25, 2009

(51) Int. Cl.
*H03K 9/00* (2006.01)

(52) U.S. Cl. ... 375/316; 370/320; 370/441; 375/E1.032; 375/346; 329/320; 329/349

(58) Field of Classification Search ........................ None
See application file for complete search history.

(56) References Cited

U.S. PATENT DOCUMENTS 4,556,900 A * 12/1985 Willis .......................... 348/574
5,799,011 A 8/1998 LaRosa et al.
6,137,839 A 10/2000 Mannering et al.
6,243,410 B1 6/2001 LaRosa et al.
7,260,139 B2 8/2007 Tene et al.
7,340,013 B2 3/2008 Ammer et al.
7,555,067 B2 6/2009 Jeong
2002/0018446 A1* 2/2002 Huh et al. .................... 370/245
2003/0031130 A1 2/2003 Vanghi
2003/0165190 A1 9/2003 Sindhushayana et al.
2007/0002982 A1* 1/2007 Heikkila ...................... 375/346
2007/0036246 A1 2/2007 Hammerschmidt

FOREIGN PATENT DOCUMENTS

GB 2434948 8/2007

OTHER PUBLICATIONS

International Search Report and Written Opinion—PCT/US2008/087644, International Search Authority—European Patent Office—Jul. 15, 2009 (070976).
European Search Report—EP08006410 Search Authority—Munich Patent Office Jul. 8, 2009.

* cited by examiner

*Primary Examiner* — David C. Payne
*Assistant Examiner* — Adolf Dsouza
(74) *Attorney, Agent, or Firm* — Jonathan T. Velasco; Sayed H. Beladi

(57) ABSTRACT

An access terminal for processing a communication signal includes a receiver. The receiver is configured to determine a bias point for the communication signal based on a quality measurement of the communication signal, the quality measurement having a carrier-to-interference (C/I) estimate associated therewith. The receiver is further configured to determine a C/I cap for the communication signal using the C/I estimate, the C/I cap being configured to cap a signal to interference-plus-noise ratio (SINR) of the communication signal. In addition, the receiver is configured to process the communication signal using the determined bias point and the determined C/I cap. A method is also provided for processing a communication signal.

56 Claims, 6 Drawing Sheets

502
DETERMINING A BIAS POINT FOR THE COMMUNICATION SIGNAL BASED ON A QUALITY MEASUREMENT OF THE COMMUNICATION SIGNAL, THE QUALITY MEASUREMENT HAVING A C/I ESTIMATE ASSOCIATED THEREWITH

504
DETERMINING A C/I CAP FOR THE COMMUNICATION SIGNAL USING THE C/I ESTIMATE, THE C/I CAP FOR CAPPING A SINR OF THE COMMUNICATION SIGNAL

506
PROCESSING THE COMMUNICATION SIGNAL USING THE DETERMINED BIAS POINT AND THE DETERMINED C/I CAP

METHOD AND APPARATUS FOR PROCESSING A COMMUNICATION SIGNAL

TECHNICAL FIELD

The present invention generally relates to communication signals, and more specifically to a method and apparatus for processing a communication signal.

BACKGROUND

In the field of digital communication, it is desired to have wide dynamic range and precision for digital numeric representation. However, quantization and saturation effects, typically due to the finite precision resulting from the number of bits chosen to represent a number, may limit dynamic range and accuracy. Increasing the number of bits may improve quantization and saturation effects, but such an increase typically increases the memory requirement and complexity of a system. Accordingly, the processing of communication signals with reasonable quantization and saturation performance, together with a reduced number of bits, is desired.

SUMMARY

In one aspect of the disclosure, an access terminal for processing a communication signal is provided. The access terminal includes a receiver configured to determine a bias point for the communication signal based on a quality measurement of the communication signal, the quality measurement having a carrier-to-interference (C/I) estimate associated therewith. The receiver is further configured to determine a C/I cap for the communication signal using the C/I estimate, the C/I cap being configured to cap a signal to interference-plus-noise ratio (SINR) of the communication signal. In addition, the receiver is configured to process the communication signal using the determined bias point and the determined C/I cap.

In a further aspect of the disclosure, a method for processing a communication signal is provided. The method includes determining a bias point for the communication signal based on a quality measurement of the communication signal, the quality measurement having a carrier-to-interference (C/I) estimate associated therewith. The method further includes determining a C/I cap for the communication signal using the C/I estimate, the C/I cap for capping a signal to interference-plus-noise ratio (SINR) of the communication signal. In addition, the method includes processing the communication signal using the determined bias point and the determined C/I cap.

In yet a further aspect of the disclosure, an apparatus for processing a communication signal is provided. The apparatus includes means for determining a bias point for the communication signal based on a quality measurement of the communication signal, the quality measurement having a carrier-to-interference (C/I) estimate associated therewith. The apparatus further includes means for determining a C/I cap for the communication signal using the C/I estimate, the C/I cap being configured to cap a signal to interference-plus-noise ratio (SINR) of the communication signal. In addition, the apparatus includes means for processing the communication signal using the determined bias point and the determined C/I cap.

In yet a further aspect of the disclosure, a processing system for processing a communication signal is provided. The processing system includes a module configured to determine a bias point for the communication signal based on a quality measurement of the communication signal, the quality measurement having a carrier-to-interference (C/I) estimate associated therewith. The module is further configured to determine a C/I cap for the communication signal using the C/I estimate, the C/I cap being configured to cap a signal to interference-plus-noise ratio (SINR) of the communication signal. In addition, the module is configured to process the communication signal using the determined bias point and the determined C/I cap.

In yet a further aspect of the disclosure, a machine-readable medium encoded with instructions for processing a communication signal is provided. The instructions include code for determining a bias point for the communication signal based on a quality measurement of the communication signal, the quality measurement having a carrier-to-interference (C/I) estimate associated therewith. The instructions further include code for determining a C/I cap for the communication signal using the C/I estimate, the C/I cap for capping a signal to interference-plus-noise ratio (SINR) of the communication signal. In addition, the instructions include code for processing the communication signal using the determined bias point and the determined C/I cap.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

DETAILED DESCRIPTION

Figure 1:
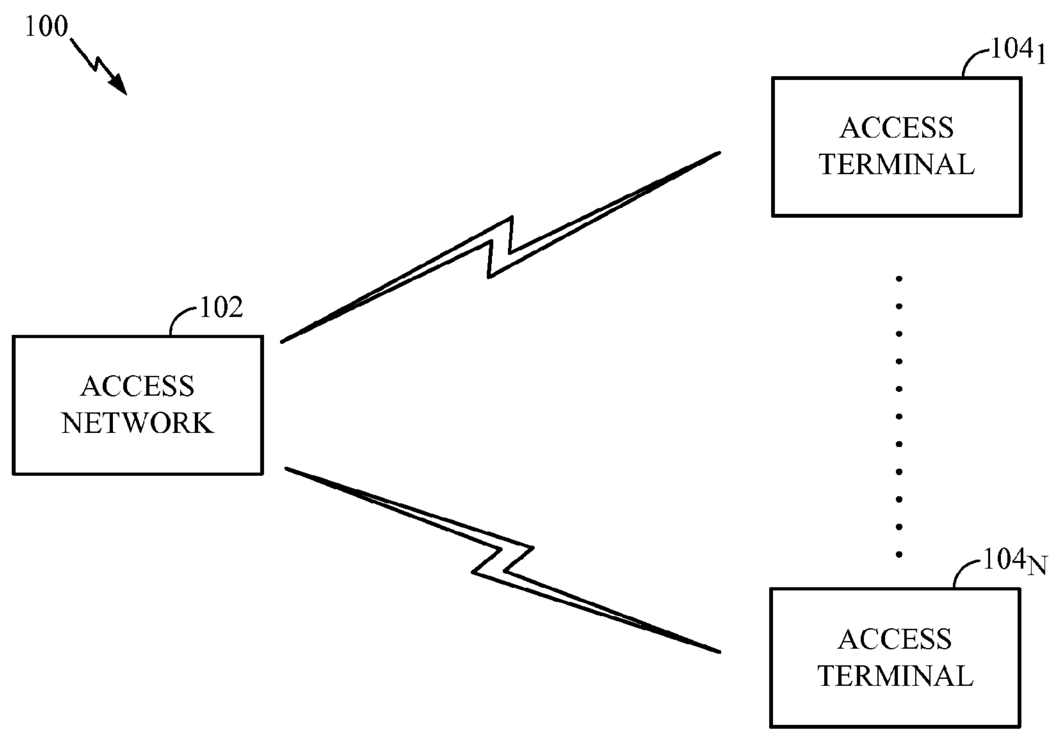
FIG. 1 is a diagram illustrating an example of a wireless communication system in which processing of a communication signal can be used.

FIG. 1 is a diagram illustrating an example of a wireless communication system in which processing of a communication signal can be used. Wireless communication system 100 includes an access network 102 which can communicate with multiple access terminals $\mathbf{104}_1$ to $\mathbf{104}_N$. Access terminals $\mathbf{104}_1$ to $\mathbf{104}_N$ can also communicate with each other via access network 102. A communication link from the access network to one of access terminals $\mathbf{104}_1$ to $\mathbf{104}_N$ is typically referred to as a forward link, and a communication link from one of access terminals $\mathbf{104}_1$ to $\mathbf{104}_N$ to access network 102 is typically referred to as a reverse link.

Any of access terminals $104_1$ to $104_N$ can represent a mobile phone, a computer, a laptop computer, a telephone, a personal digital assistant (PDA), an audio player, a game console, a camera, a camcorder, an audio device, a video device, a multimedia device, a component(s) of any of the foregoing (such as a printed circuit board(s), an integrated circuit(s), and/or a circuit component(s)), or any other device capable of supporting wireless communication. In addition, access terminals $104_1$ to $104_N$ can be stationary or mobile, and can include digital devices, analog devices or a combination of both.

Communication system 100 can correspond with an Ultra-Wideband (UWB) system, which is a radio technology for Wireless Personal Area Networks (WPAN). Communication system 100 may use one of many other communications protocols. By way of example, communication system 100 may support Evolution-Data Optimized (EV-DO) and/or Ultra Mobile Broadband (UMB). EV-DO and UMB are air interface standards promulgated by the 3rd Generation Partnership Project 2 (3GPP2) as part of the CDMA2000 family of standards and employ multiple access techniques such as Code Division Multiple Access (CDMA) to provide broadband Internet access to mobile subscribers. Alternatively, communication system 100 may support Long Term Evolution (LTE), which is a project within the 3GPP2 to improve the Universal Mobile Telecommunications System (UMTS) mobile phone standard based primarily on a Wideband CDMA (W-CDMA) air interface. Communication system 100 may also support the WiMAX standard associated with the WiMAX forum. These are merely exemplary protocols, and communication system 100 is not limited to these examples.

The actual communications protocol(s) employed by communication system 100 will depend on the specific application and the overall design constraints imposed on the system. The various techniques presented throughout this disclosure are equally applicable to any combination of heterogeneous or homogeneous communication protocols.

Figure 2:
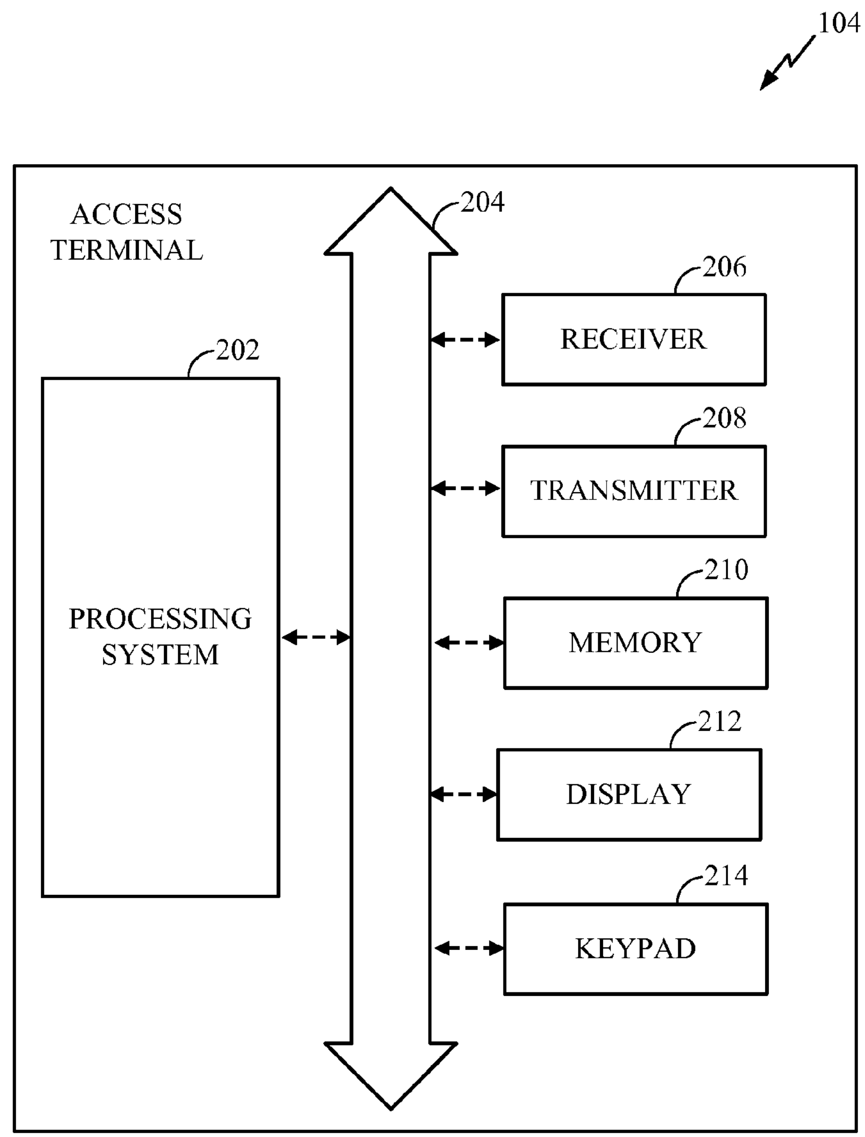
FIG. 2 is a conceptual block diagram illustrating an example of one of the access terminals of FIG. 1.

FIG. 2 is a conceptual block diagram illustrating an example of one of the access terminals of FIG. 1. Access terminal 104 includes a processing system 202 which is capable of communication with a receiver 206 and transmitter 208 through a bus 204 or other structures or devices. It should be understood that communication means other than busses can be utilized with the disclosed configurations. Processing system 202 can generate audio, video, multimedia, and/or other types of data to be provided to transmitter 208 for communication. In addition, audio, video, multimedia, and/or other types of data can be received at receiver 206, and processed by processing system 202.

Processing system 202 may include a general purpose processor and volatile or non-volatile memory for storing data and instructions for software programs. The software programs, which may be stored in memory 210, may be used by processing system 202 to control and manage access to the various networks, as well as provide other communication and processing functions. The software programs may also provide an interface to processing system 202 for various user interface devices, such as a display 212 and a keypad 214. Processing system 202 may also include a digital signal processor (DSP) with an embedded software layer to offload various signal processing functions, such as convolutional encoding, modulation and spread-spectrum processing. The DSP may also perform encoder functions to support telephony applications.

In a case where communication system 100 is a 1X-EVDO system, access terminal 104 is typically responsible for estimating the forward link pilot channel's carrier to interference ratio (C/I), and for transforming that measurement into a feedback channel sent to access network 102. The feedback channel is typically in the form of a data rate control (DRC) channel. The DRC channel is then subsequently demodulated at access network 102 and fed into a scheduler. When access network 102 transmits to access terminal 104, access network 102 transmits the forward link waveform with the packet type desired by access terminal 104, as indicated by the DRC channel sent by access terminal 104. Thus, when access terminal 104 receives a packet from the access network 102, access terminal 206 knows a priori the packet format that it will receive.

Different DRCs typically correspond with different packet types. For example, DRC 13 typically includes 3136 modulation symbols, and 4 interlaces for a hybrid automatic repeat request (H-ARQ) scheme. Further, for EV-DO revision A, DRC 13 corresponds to packets with the largest number of modulation symbols, and with 4 interlaces.

When processing a forward link waveform receiving DRC 13, for example, an access terminal may use a fixed scaling at each point of its processing, where the fixed scaling encompasses the entire dynamic range with acceptable quantization noise as desired by a system designer. A backend RAM (not shown) for such an access terminal can thus be sized at $M_S \times N_{HARQ} \times S_{BW} \times M_C \times 2$, where $M_S$ represents the number of modulated symbols to store, $N_{HARQ}$ represents the number of interlaces, $S_{BW}$ represents the bit width per phase of the symbol, and $M_C$ represents the number of simultaneous carriers (e.g., 1 in EV-DO revision A). As such, a system that provides higher throughput, by increasing $M_S$, $N_{HARQ}$, or $M_C$, requires a significant increase in memory size.

In addition to the above, the expected signal to interference-plus-noise ratio (SINR) needed to support the wide variety of packet formats typically spans a wide range (e.g., from −11 dB to >19.5 dB). As such, it is desirable for the backend RAM (or other memory of an access terminal) to be smaller in size, but capable of supporting such a wide range.

Figure 3:
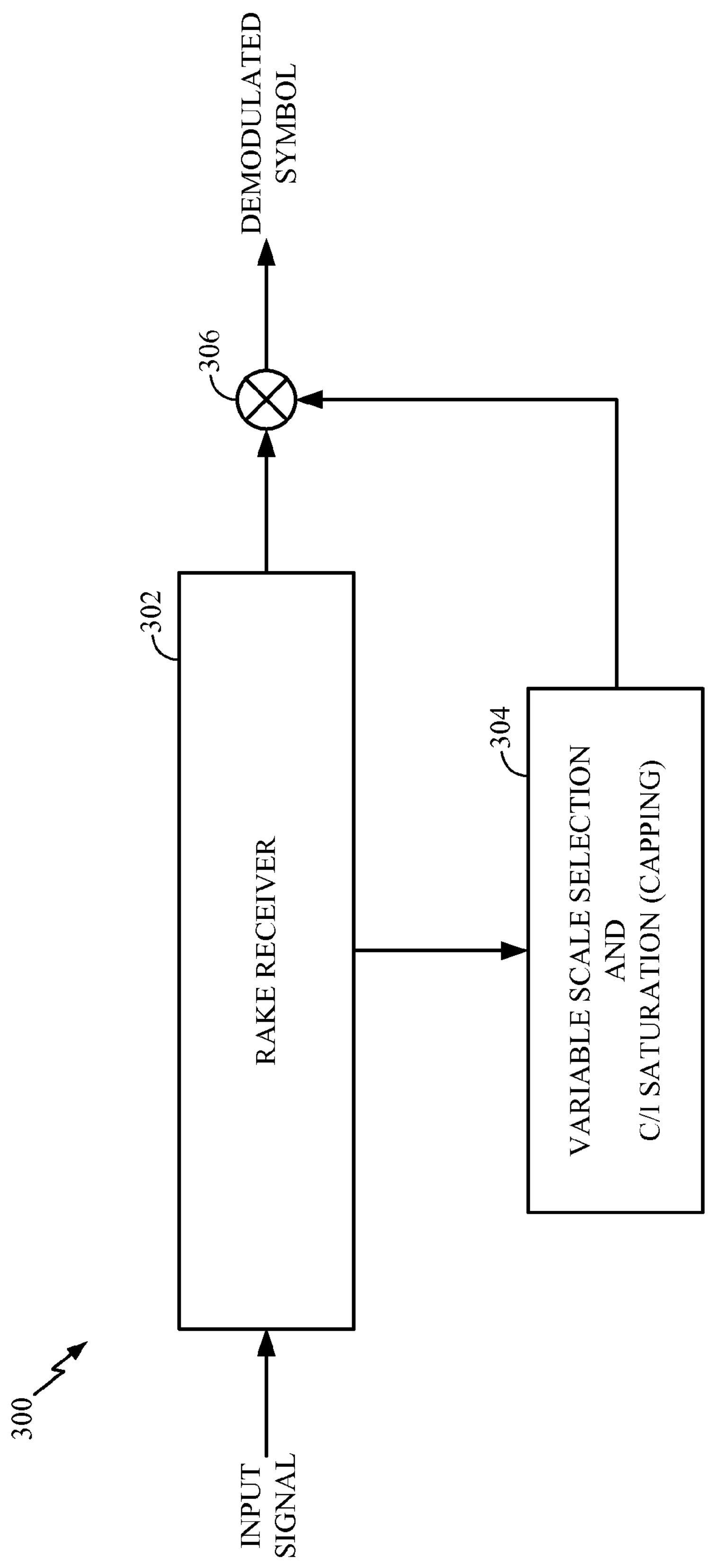
FIG. 3 is a conceptual block diagram illustrating an exemplary receiver system, with a RAKE receiver, for performing variable scaling and C/I saturation.

FIG. 3 is a conceptual block diagram illustrating an exemplary receiver system with a RAKE receiver, for performing variable scaling and C/I saturation. Receiver system 300 includes a RAKE receiver 302, variable scale selection and C/I saturation (VSS C/I) module 304. Receiver system 300 may further include a multiplier 306. RAKE receiver 302 can receive an input signal and output a demodulated signal. The demodulated signal can be multiplied with output from VSS C/I module 306, thereby scaling the demodulated signal. Output from multiplier 306 can be a demodulated signal corresponding to the floating point value of the input signal. According to one configuration of the subject technology, receiver 206 of FIG. 2 can be seen to correspond with RAKE receiver 302, or with receiver system 300. In this regard, VSS C/I module 304 and multiplier 306 can be included in receiver 206, or can be implemented in another part of access terminal 102, such as processing system 202.

Receiver system 300 may process a properly modulated and filtered forward link waveform, to recover the original stream of information bits. For example, receiver system 300 can begin its processing with a stream of offset two's complement receiver samples and can produce decoded bits to processing system 202, as necessary. As noted above, when access terminal 104 receives a packet from the access network 102, access terminal 104 knows a priori the packet format that it will receive.

According to one aspect of the present disclosure, receiver system 300 does not use fixed scaling to process the input signal. In addition, receiver system 300 may be preferably configured to use less bits (e.g., 8-10 bits per phase) than a fixed scaling system (e.g., 16 bits per phase).

In one example, the memory requirement for receiver system 300 is reduced by resizing the number of bits per phase. For example, in a case where receiver system 300 includes a backend RAM (not shown), the backend RAM can be resized from 16 bits per I and Q phase to 8 to 10 bits per phase in memory 210. It should be noted that the resized bits do not necessarily have to reside in the backend RAM, but can reside in another portion of memory 210. However, for purposes of this example, discussion is provided with reference to a backend RAM.

Reducing the size of the backend RAM may typically limit the dynamic range of the demodulated symbol. A fixed scaling system will likely not result in acceptable performance spanning across all candidate packet formats. Therefore, instead of fixed scaling, the demodulated signal can be variably adjusted, to optimize the amount of storage in the backend RAM.

Taking both quantization effects and saturation effects into account, a variable gain can be applied to the symbols, which are then stored in the backend RAM, by using a DRC dependent scaling system. To avoid excessive saturation, the final symbol can be biased to a lower point, without introducing excessive quantization noise. The variable bias point can reduce the dynamic range requirement as a function of modulation format, where the modulation format information is provided by the DRC channel.

The variable bias point can be selected using VSS C/I module 304 of FIG. 3. For each DRC and receiver type (e.g., RAKE receiver 302 of FIG. 3 or equalizer filter 402 of FIG. 4), the acceptable bias points can be determined for symbols in the backend RAM based on quantization noise. Such determination of acceptable bias points can be performed by simulating the various DRCs and receiver types over a wide SINR range. When performing such simulations, bias points associated with negligible quantization noise are preferably selected. For example, bias points can be considered in the range from 256 to 1/16 $I_{or}/N_t$, wherein $I_{or}/N_t$ represents the measurement of the total signal to total noise ratio as measured at receiving system 300, in steps of decreasing powers of 2. However, it should be noted that any range can be used. Further, using steps of decreasing powers of 2 is seen to ease implementation of hardware.

In addition, a C/I cap on SINR for the communication signal is determined, to indicate over what range of SINR the bias point is acceptable before performance degrades (e.g., what range of SINR values meet a performance criteria). The determination of a C/I cap will be described in greater detail below.

After bias points have been determined, a bias point can be applied to the input signal. With reference to FIG. 3, the bias can be applied to the input signal by multiplying the demodulated signal from RAKE receiver 302 with the output of VSS C/I module 304, using multiplier 306. To apply the determined bias point to a particular symbol, scaling of the pilot phase estimate can be used. Due to the wide dynamic range that receiver system 300 can support (e.g., C/I can vary from −15 dB to 23 dB), the pilot phase estimate can be appropriately scaled such that the final scaling on the demodulated symbol lies within an acceptable range for $I_{or}/N_t$.

Symbol demodulation may be accomplished by taking the projection of the data symbol on the pilot phase estimate vector provided. Typically, for complex modulated symbols, a receiver extracts both the inphase and quadrature phase components of the demodulated symbol. The inphase component can be computed using the complex dot product as follows:

$$\text{Complex Dot Product } I=P_I D_I+P_Q D_Q \quad \text{(Equation 1)}$$

Further, the quadrature phase component can be computed using the complex cross product as follows:

$$\text{Complex Cross Product } Q=P_I D_Q-P_Q D_I \quad \text{(Equation 2)}$$

where $P_I$ and $P_Q$ are the real and imaginary parts of the pilot phase estimate vector, and $D_I$ and $D_Q$ are the real and imaginary parts of the data symbol, and I and Q are the real and imaginary parts of the demodulated symbol, respectively.

As noted above, in addition to determining a bias point, a cap on SINR for the communication signal is determined, to indicate over what range of SINR the bias point is acceptable before performance degrades. This cap can be determined by VSS C/I module 304.

Each DRC typically has a wide range of gain values with acceptable performance. However, certain modulation format types, which correspond with certain DRCs, are more sensitive to demodulated symbol saturation. In particular, the effects of symbol saturation at high SINR can be severe for higher modulation formats. For these DRCs, the packet error rate (PER) tends to increase as SINR increases.

As such, a per packet C/I cap may be applied to ensure that symbol saturation is kept at a level such that performance of receiver system 300 is not compromised. To avoid a hit in throughput, the C/I cap may be chosen high enough so that if a packet format had a counterpart spanning a fewer number of slots (i.e., if the bits per packet and modulation formats are the same with the number of slots being different), the packet can decode early at sufficiently high SINR.

The C/I cap value is used to cap the C/I estimate, which is obtained from the DRC. In other words, once a C/I cap value is determined, the C/I estimate is compared with the C/I cap value. If the C/I estimate is higher than the C/I cap value, the C/I estimate can be reduced to equal the C/I cap value.

According to another aspect of this disclosure, instead of using the DRC feedback information sent from access terminal 104 to access network 104, access terminal 104 can estimate the C/I of the received signal, and variably bias this demodulated symbol based on the C/I estimate. In other words, the scaling would be sensitive to variance of the C/I estimate. In addition, the C/I cap can be determined based on a second order statistic of the received signal or the demodulated symbol.

As noted above, after the bias point and C/I cap have been determined by VSS C/I module 304, the demodulated symbol from 302 can be multiplied via multiplier 306. As such, the resultant signal is at the determined bias along with the effective C/I estimate, which is at the determined C/I cap value if the original C/I estimate is higher than the C/I cap value. The demodulated symbol corresponds with the real floating point value of the input signal, and quantization and saturation effects are seen to be improved with a reduced number of bits per phase.

The backend RAM can be resized to any number of bits per phase. For example, backend RAM can be resized to 8 or 10 bits per phase. Simulations performed on an 8, 9 or 10 bit backend RAM can be used to determine quantization noise performance for the backend RAMs of other bit sizes. For saturation effects, performance for the backend RAMs of other bit sizes can be inferred from the simulation results.

Figure 4:
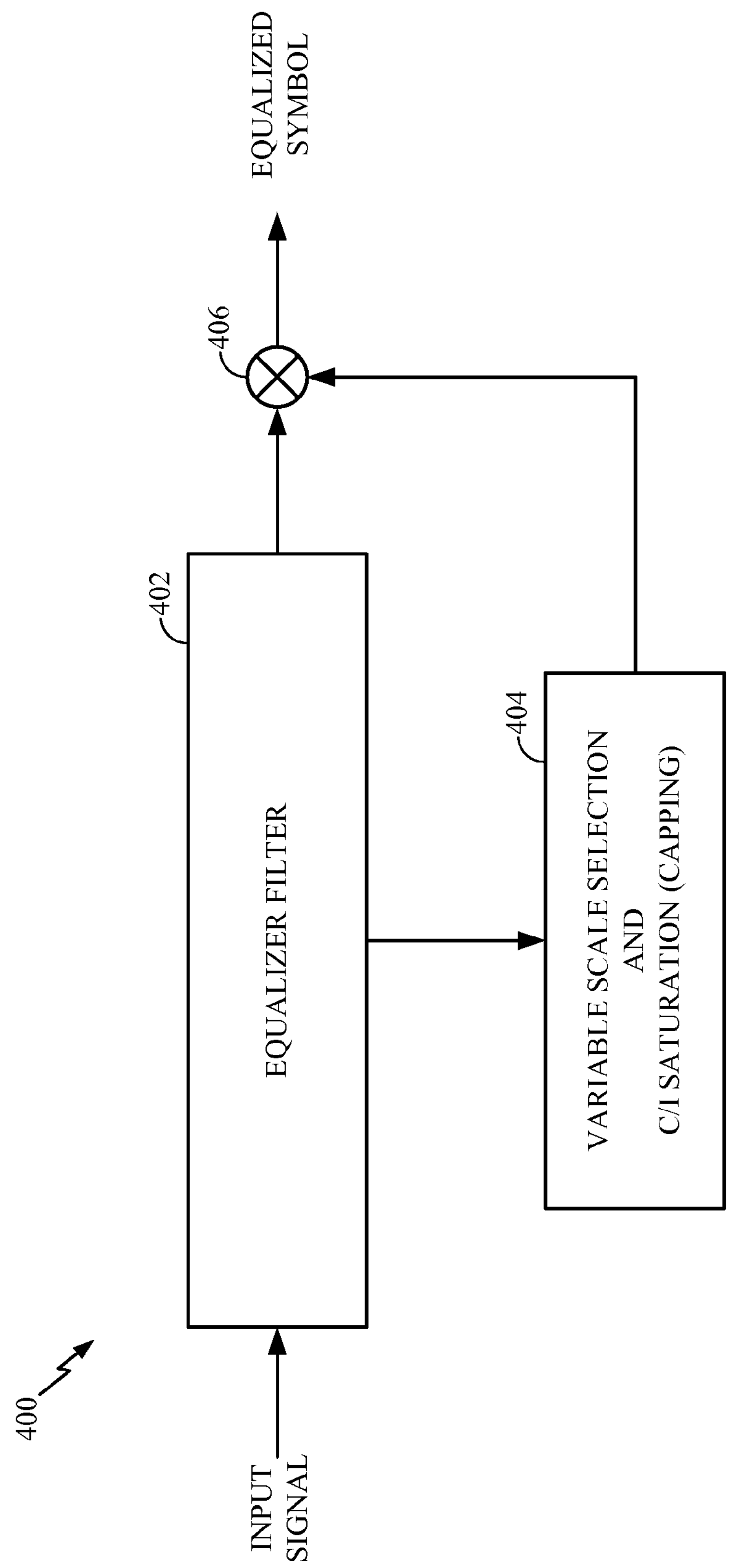
FIG. 4 is a conceptual block diagram illustrating an exemplary receiver system, with an equalizer filter, for performing variable scaling and C/I saturation.

FIG. 4 is a conceptual block diagram illustrating an exemplary receiver system, with an equalizer filter, for performing variable scaling and C/I saturation. Receiver system 400 includes equalizer filter 402, variable scale selection and C/I saturation (VSS C/I) module 404. Receiver system 400 may further include a multiplier 406. Equalizer filter 402 can receive an input signal and output an equalized signal. The equalized signal can be multiplied with output from VSS C/I module 406, thereby scaling the equalized signal. Output from multiplier 306 can be an equalized signal corresponding to the floating point value of the input signal. According to one configuration of the subject technology, receiver 206 of FIG. 2 can be seen to correspond with equalizer filter 402, or with receiver system 400. In this regard, VSS C/I module 404 and multiplier 406 can be included in receiver 206, or can be implemented in another part of access terminal 102, such as processing system 202.

Receiver system 400 can scale an input signal and apply a C/I cap to the input signal. Receiver system 400 can perform such scaling and capping in a manner similar to that described above with reference to FIG. 3. However, instead of demodulating the signal with RAKE receiver 302, receiver system 400 equalizes the input signal using equalizer filter 402.

Regarding C/I capping, equalizer filter 402 typically operates in the moderate to high SINR region. As such, even with the DRC dependent scaling, saturation effects typically cause the packet error rate (PER) to increase at high SINR. The C/I cap, which can depend on the DRC, can be applied to the C/I estimate. Since this may affect performance of receiver system 400, the C/I cap values can be chosen to be much higher than the 1% PER point.

As described above with reference to FIGS. 1 to 4, access terminal 104 can optimize the required number of bits to hold a required dynamic range, by utilizing a variable biasing algorithm based on channel feedback In addition, access terminal 104 can apply a per packet C/I cap to limit the effects of symbol saturation.

Figure 5:
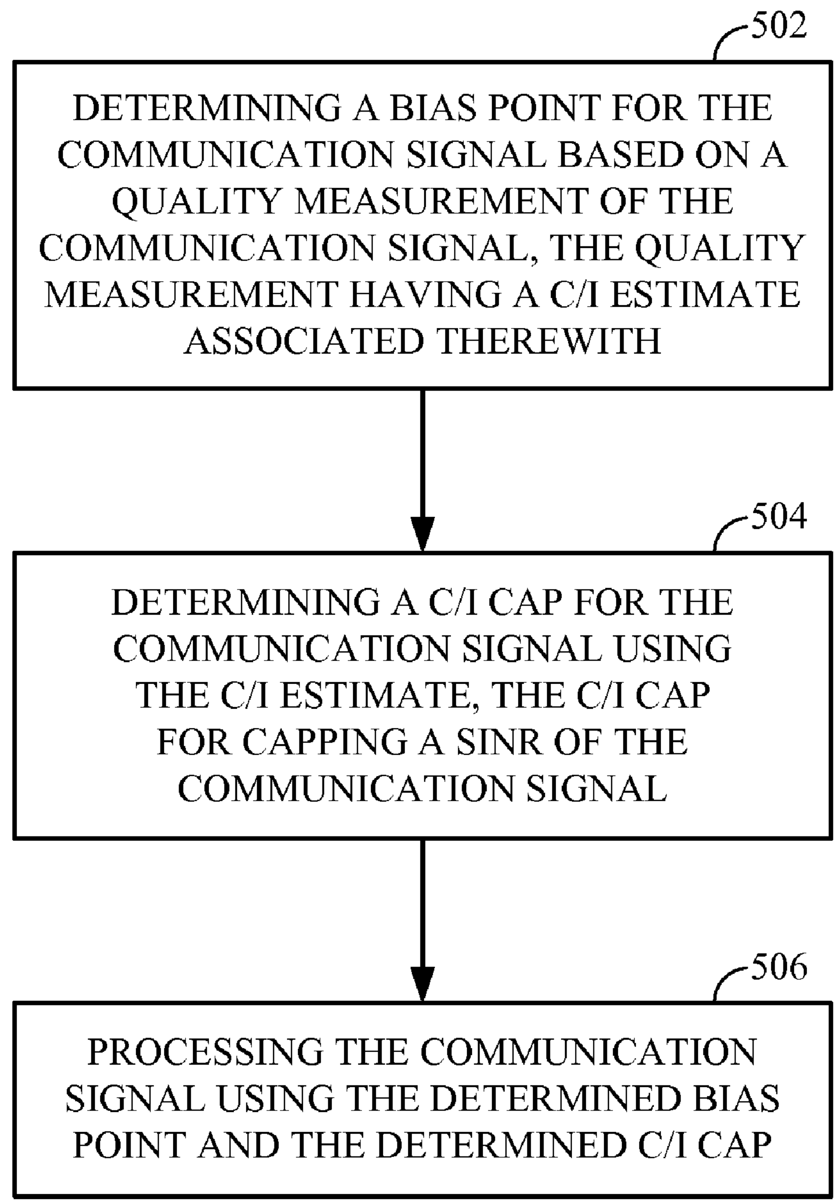
FIG. 5 is a flowchart illustrating an exemplary operation of processing of a communication signal.

FIG. 5 is a flowchart illustrating an exemplary operation of processing of a communication signal. In step 502, a bias point for the communication signal is determined based on a quality measurement of the communication signal. The quality measurement has a carrier-to-interference (C/I) estimate associated therewith. In step 504, a C/I cap is determined for the communication signal using the C/I estimate. The C/I cap is for capping a signal to interference-plus-noise ratio (SINR) of the communication signal. In step 506, the communication signal is processed using the determined bias point and the determined C/I cap.

Figure 6:
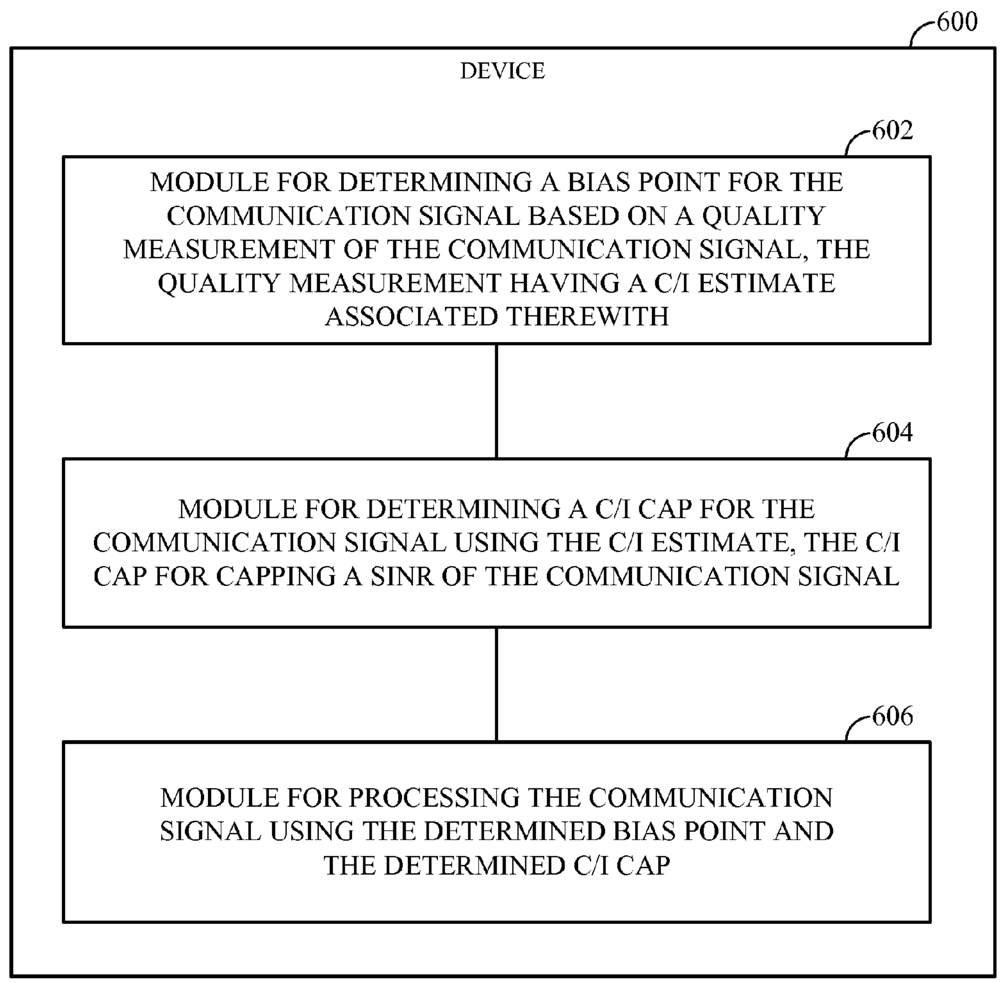
FIG. 6 is a conceptual block diagram illustrating an example of the functionality of a device for processing of a communication signal.

FIG. 6 is a conceptual block diagram illustrating an example of the functionality of a device for processing of a communication signal. Device 600 includes a module 602 for determining a bias point for the communication signal based on a quality measurement of the communication signal. The quality measurement has a carrier-to-interference (C/I) estimate associated therewith. Device 600 further includes a module 604 for determining a C/I cap for the communication signal using the C/I estimate. The C/I cap is configured to cap a signal to interference-plus-noise ratio (SINR) of the communication signal. In addition, device 600 includes a module 606 for processing the communication signal using the determined bias point and the determined C/I cap.

Referring back to FIG. 2, processing system 202 may be implemented using software, hardware, or a combination of both. By way of example, processing system 202 may be implemented with one or more processors. A processor may be a general-purpose microprocessor, a microcontroller, a digital signal processor (DSP), an application specific integrated circuit (ASIC), a field programmable gate array (FPGA), a programmable logic device (PLD), a controller, a state machine, gated logic, discrete hardware components, or any other suitable device that can perform calculations or other manipulations of information. Processing system 202 may also include one or more machine-readable media for storing software. Software shall be construed broadly to mean instructions, data, or any combination thereof, whether referred to as software, firmware, middleware, microcode, hardware description language, or otherwise. Instructions may include code (e.g., in source code format, binary code format, executable code format, or any other suitable format of code).

Machine-readable media may include storage integrated into a processor, such as might be the case with an ASIC. Machine-readable media may also include storage external to a processor, such as a random access memory (RAM), a flash memory, a read only memory (ROM), a programmable read-only memory (PROM), an erasable PROM (EPROM), registers, a hard disk, a removable disk, a CD-ROM, a DVD, or any other suitable storage device. In addition, machine-readable media may include a transmission line or a carrier wave that encodes a data signal. Those skilled in the art will recognize how best to implement the described functionality for processing system 202. According to one aspect of the disclosure, a machine-readable medium is a computer-readable medium encoded or stored with instructions and is a computing element, which defines structural and functional interrelationships between the instructions and the rest of the system, which permit the instructions' functionality to be realized. Instructions may be executable, for example, by an access terminal or a processing system. Instructions can be, for example, a computer program including code. A machine-readable medium may comprise one or more media.

Those of skill in the art would appreciate that the various illustrative blocks, modules, elements, components, methods, and algorithms described herein may be implemented as electronic hardware, computer software, or combinations of both. For example, each of the rake receiver, variable scale selection and C/I saturation (VSS C/I) module, multiplier, and equalizer filter may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Furthermore, various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description is provided to enable any person skilled in the art to practice the various configurations described herein. Various modifications to these configurations will be readily apparent to those skilled in the art, and the generic principles defined herein may be applied to other configurations. Thus, the claims are not intended to be limited to the configurations shown herein, but is to be accorded the full scope consistent with the claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the invention.

The terms used herein such as "for example," "for instance," "example," "instance," "by way of example," "such as," and the like indicate an illustration by way of example, and not by way of limitation. All structural and functional equivalents to the elements of the various configurations described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. An access terminal for processing a communication signal, the access terminal comprising a receiver configured to:

determine a bias point for the communication signal based on a quality measurement of the communication signal, the quality measurement having a carrier-to-interference (C/I) estimate associated therewith;

determine a C/I cap for the communication signal using the C/I estimate, the C/I cap being configured to cap a signal to interference-plus-noise ratio (SINR) of the communication signal; and process the communication signal using the determined bias point and the determined C/I cap, wherein the receiver is configured to determine the bias point by selecting a particular bias point of multiple predetermined bias points that are associated with a plurality of packet types and wherein each of the multiple predetermined bias points is determined via simulation testing.

2. The access terminal of claim 1, wherein the access terminal is further configured to send feedback information of a forward link pilot channel to a device external to the access terminal via a feedback channel, the feedback information identifying one of the plurality of packet types for the communication signal.

3. The access terminal of claim 2, wherein the feedback channel is a data rate control (DRC) channel, and wherein the quality measurement is fed back to the device external to the access terminal via the DRC channel.

4. The access terminal of claim 1, wherein the receiver is configured to determine the C/I cap based on a range of SINR values that meet a performance criteria for the determined bias point, the C/I cap corresponding to a maximum value of the range of SINR values.

5. The access terminal of claim 4, wherein the maximum value is determined via simulation testing.

6. The access terminal of claim 1, wherein the quality measurement is based on an estimate of a C/I ratio of the communication signal, and wherein the receiver is configured to determine the C/I cap based on a second order statistic of the communication signal.

7. The access terminal of claim 1, wherein the receiver is configured to reduce quantization noise of the communication signal.

8. The access terminal of claim 1, wherein the receiver is configured to reduce symbol saturation of the communication signal.

9. The access terminal of claim 1, wherein the receiver is configured to process the communication signal by multiplying the communication signal such that the communication signal is brought to the determined bias point, and by capping the SINR of the communication signal using the determined C/I cap.

10. The access terminal of claim 1, wherein the receiver comprises a RAKE receiver, which is configured to demodulate the communication signal.

11. The access terminal of claim 1, wherein the receiver is comprises an equalizer filter, which is configured to equalize the communication signal.

12. A method for processing a communication signal, the method comprising:

determining a bias point for the communication signal based on a quality measurement of the communication signal, the quality measurement having a carrier-to-interference (C/I) estimate associated therewith;

determining a C/I cap for the communication signal using the C/I estimate, the C/I cap for capping a signal to interference-plus-noise ratio (SINR) of the communication signal; and processing the communication signal using the determined bias point and the determined C/I cap, wherein the bias point is determined by selecting a particular bias point of multiple predetermined bias points that are associated with a plurality of packet types and wherein each of the multiple predetermined bias points is determined via simulation testing.

13. The method of claim 12, wherein the determining the bias point, the determining the C/I cap and the processing the communication signal are performed in an access terminal, and wherein the method further comprises sending feedback information of a forward link pilot channel to a device external to the access terminal via a feedback channel, the feedback information identifying one of the plurality of packet types for the communication signal.

14. The method of claim 13, wherein the feedback channel is a data rate control (DRC) channel, and wherein the quality measurement is fed back to the device external to the access terminal via the DRC channel.

15. The method of claim 12, wherein the determining the C/I cap is based on a range of SINR values that meet a performance criteria for the determined bias point, the C/I cap corresponding to a maximum value of the range of SINR values.

16. The method of claim 15, wherein the maximum value is determined via simulation testing.

17. The method of claim 12, wherein the quality measurement is based on an estimate of a C/I ratio of the communication signal, and wherein the determining the C/I cap is based on a second order statistic of the communication signal.

18. The method of claim 12, wherein the processing the communication signal using the determined bias point and the determined C/I cap reduces quantization noise of the communication signal.

19. The method of claim 12, wherein the processing the communication signal using the determined bias point and the determined C/I cap reduces symbol saturation of the communication signal.

20. The method of claim 12, wherein the processing the communication signal comprises multiplying the communication signal such that the communication signal is brought to the determined bias point, and capping the SINR of the communication signal using the determined C/I cap.

21. The method of claim 12, wherein the method is performed by a RAKE receiver, which is configured to demodulate the communication signal.

22. The method of claim 12, wherein the method is performed by an equalizer filter, which is configured to equalize the communication signal.

23. An apparatus for processing a communication signal, the apparatus comprising:

means for determining a bias point for the communication signal based on a quality measurement of the communication signal, the quality measurement having a carrier-to-interference (C/I) estimate associated therewith;

means for determining a C/I cap for the communication signal using the C/I estimate, the C/I cap being configured to cap a signal to interference-plus-noise ratio (SINR) of the communication signal; and means for processing the communication signal using the determined bias point and the determined C/I cap, wherein the means for determining the bias point is configured to determine the bias point by selecting a particular bias point of multiple predetermined bias points that are associated with a plurality of packet types and wherein each of the multiple predetermined bias points is determined via simulation testing.

24. The apparatus of claim 23, wherein the apparatus is an access terminal.

25. The apparatus of claim 24, wherein the apparatus further comprises means for sending feedback information of a forward link pilot channel to a device external to the access terminal via a feedback channel, the feedback information identifying one of the plurality of packet types for the communication signal.

26. The apparatus of claim 25, wherein the feedback channel is a data rate control (DRC) channel, and wherein the quality measurement is fed back to the device external to the access terminal via the DRC channel.

27. The apparatus of claim 23, wherein the means for determining the C/I cap determines the C/I cap based on a range of SINR values that meet a performance criteria for the determined bias point, the C/I cap corresponding to a maximum value of the range of SINR values.

28. The apparatus of claim 27, wherein the maximum value is determined via simulation testing.

29. The apparatus of claim 23, wherein the quality measurement is based on an estimate of a C/I ratio of the communication signal, and wherein the means for determining the C/I cap determines the C/I cap based on a second order statistic of the communication signal.

30. The apparatus of claim 23, wherein the means for processing the communication signal using the determined bias point and the determined C/I cap reduces quantization noise of the communication signal.

31. The apparatus of claim 23, wherein the means for processing the communication signal using the determined bias point and the determined C/I cap reduces symbol saturation of the communication signal.

32. The apparatus of claim 23, wherein the means for processing the communication signal multiplies the communication signal such that the communication signal is brought to the determined bias point, and caps the SINR of the communication signal using the determined C/I cap.

33. The apparatus of claim 23, wherein the apparatus comprises a RAKE receiver, which is configured to demodulate the communication signal.

34. The apparatus of claim 23, wherein the apparatus comprises an equalizer filter, which is configured to equalize the communication signal.

35. A processing system for processing a communication signal, the processing system comprising a module configured to:

determine a bias point for the communication signal based on a quality measurement of the communication signal, the quality measurement having a carrier-to-interference (C/I) estimate associated therewith;

determine a C/I cap for the communication signal using the C/I estimate, the C/I cap being configured to cap a signal to interference-plus-noise ratio (SINR) of the communication signal; and process the communication signal using the determined bias point and the determined C/I cap, wherein the bias point is determined by selecting a particular bias point of multiple predetermined bias points that are associated with a plurality of packet types and wherein each of the multiple predetermined bias points is determined via simulation testing.

36. The processing system of claim 35, wherein the processing system is an access terminal, and wherein the module is further configured to send feedback information of a forward link pilot channel to a device external to the access terminal via a feedback channel, the feedback information identifying one of the plurality of packet types for the communication signal.

37. The processing system of claim 36, wherein the feedback channel is a data rate control (DRC) channel, and wherein the quality measurement is fed back to the device external to the access terminal via the DRC channel.

38. The processing system of claim 35, wherein the module is configured to determine the C/I cap based on a range of SINR values that meet a performance criteria for the determined bias point, the C/I cap corresponding to a maximum value of the range of SINR values.

39. The processing system of claim 38, wherein the maximum value is determined via simulation testing.

40. The processing system of claim 35, wherein the quality measurement is based on an estimate of a C/I ratio of the communication signal, and wherein the module is configured to determine the C/I cap based on a second order statistic of the communication signal.

41. The processing system of claim 35, wherein the module is configured to reduce quantization noise of the communication signal.

42. The processing system of claim 35, wherein the module is configured to reduce symbol saturation of the communication signal.

43. The processing system of claim 35, wherein the module is configured to process the communication signal by multiplying the communication signal such that the communication signal is brought to the determined bias point, and by capping the SINR of the communication signal using the determined C/I cap.

44. The processing system of claim 35, wherein the module comprises a RAKE receiver, which is configured to demodulate the communication signal.

45. The processing system of claim 35, wherein the module is comprises an equalizer filter, which is configured to equalize the communication signal.

46. A machine-readable medium encoded with instructions for processing a communication signal, the instructions comprising code for:

determining a bias point for the communication signal based on a quality measurement of the communication signal, the quality measurement having a carrier-to-interference (C/I) estimate associated therewith;

determining a C/I cap for the communication signal using the C/I estimate, the C/I cap for capping a signal to interference-plus-noise ratio (SINR) of the communication signal; and processing the communication signal using the determined bias point and the determined C/I cap, wherein the bias point is determined by selecting a particular bias point of multiple predetermined bias points that are associated with a plurality of packet types and wherein each of the multiple predetermined bias points is determined via simulation testing.

47. The machine-readable medium of claim 46, wherein the determining the bias point, the determining the C/I cap and the processing the communication signal are performed in an access terminal, and wherein the instructions further comprise code for sending feedback information of a forward link pilot channel to a device external to the access terminal via a feedback channel, the feedback information identifying one of the plurality of packet types for the communication signal.

48. The machine-readable medium of claim 47, wherein the feedback channel is a data rate control (DRC) channel, and wherein the quality measurement is fed back to the device external to the access terminal via the DRC channel.

49. The machine-readable medium of claim 46, wherein the code for determining the C/I cap is based on a range of SINR values that meet a performance criteria for the determined bias point, the C/I cap corresponding to a maximum value of the range of SINR values.

50. The machine-readable medium of claim 49, wherein the maximum value is determined via simulation testing.

51. The machine-readable medium of claim 46, wherein the quality measurement is based on an estimate of a C/I ratio of the communication signal, and wherein the code for determining the C/I cap is based on a second order statistic of the communication signal.

52. The machine-readable medium of claim 46, wherein the code for processing the communication signal using the determined bias point and the determined C/I cap reduces quantization noise of the communication signal.

53. The machine-readable medium of claim 46, wherein the code for processing the communication signal using the determined bias point and the determined C/I cap reduces symbol saturation of the communication signal.

54. The machine-readable medium of claim 46, wherein the code for processing the communication signal comprises code for multiplying the communication signal such that the communication signal is brought to the determined bias point, and code for capping the SINR of the communication signal using the determined C/I cap.

55. The machine-readable medium of claim 46, wherein the instructions are performed by a RAKE receiver, which is configured to demodulate the communication signal.

56. The machine-readable medium of claim 46, wherein the instructions are performed by an equalizer filter, which is configured to equalize the communication signal.

* * * * *